Oct. 31, 1939.  R. M. RILEY  2,177,947
DISPLAY DEVICE
Filed Oct. 11, 1938
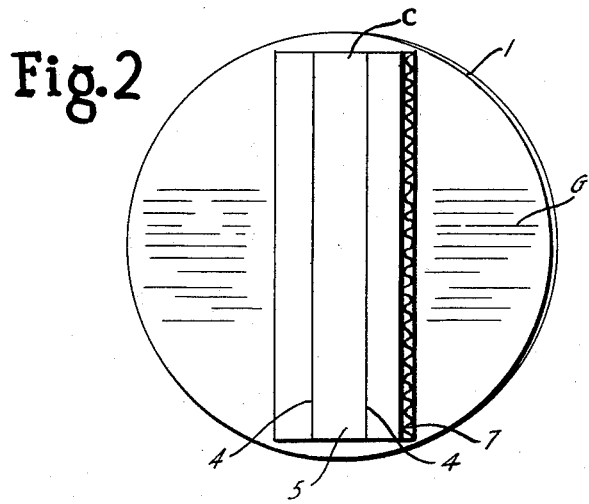
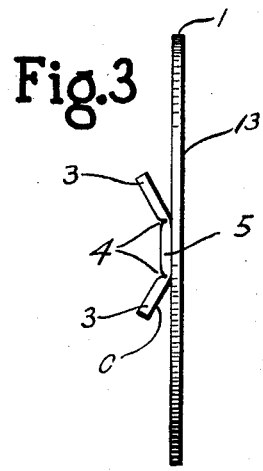
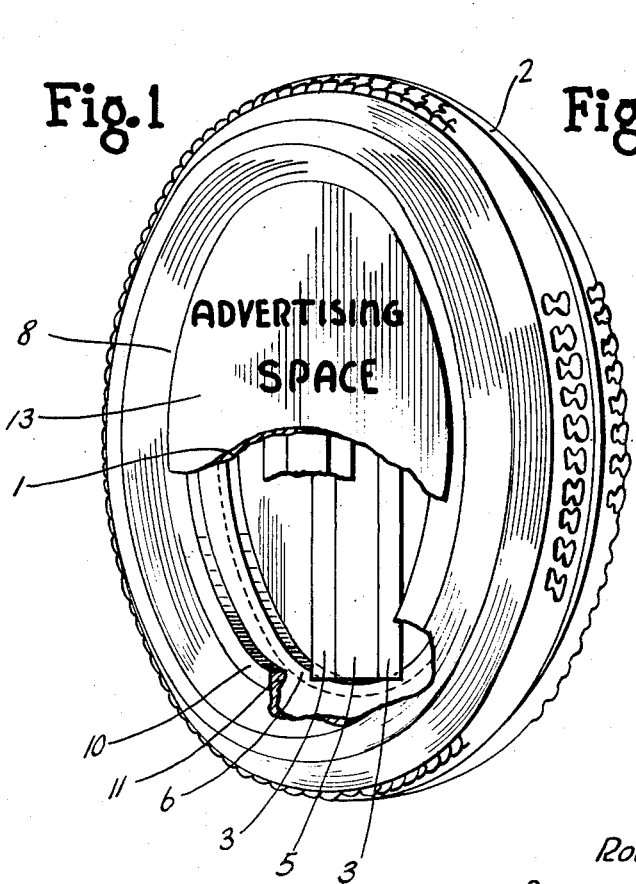
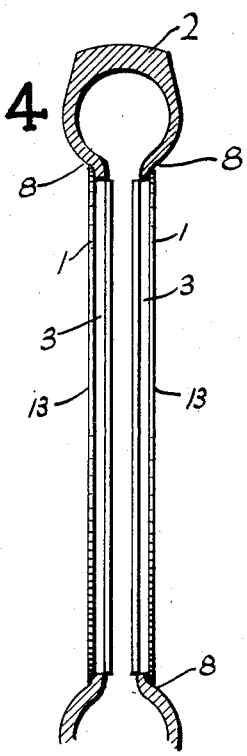
Inventor
Robert M. Riley
By
Louis W. Mahley
His Attorney Patented Oct. 31, 1939

2,177,947

UNITED STATES PATENT OFFICE 2,177,947

DISPLAY DEVICE

Robert M. Riley, Dayton, Ohio

Application October 11, 1938, Serial No. 234,345

3 Claims. (Cl. 40—125)

This invention relates to an advertising display device or advertising insert as it is sometimes termed by the trade. It relates particularly to a device circular in form made of flexible material such as lightweight or heavy paper stock which contains on its face the usual advertising art work and on the reverse side a support or easel.

The invention is particularly applicable in connection with the display of automobile tires, and the like, although other applications of the inventions will readily suggest themselves to one versed in the advertising art. It will be obvious to one skilled in the art of manufacturing display devices that other features of the invention, involving particularly the method used to maintain the display device in a holder, can be utilized with materials other than paper stock to form the advertising display disc.

In the display of automobile tires, it has heretofore been the common practice to place advertising material of disc shape within the wheel area and maintain such material within the area by somewhat complex supports. In most instances it has been the experience of display device users that similar discs were not properly supported within the wheel area, and resulted in decentering of the disc or a warping of its surface to such an extent, as to mar its appearance and destroy its advertising value.

In this invention, display devices of disc form may be inserted and properly centered in holders and articles of manufacture, particularly automobile tires, without encountering the difficulties hitherto experienced.

An object of the present invention is to provide a simple efficient and inexpensive display device, the preferred form consisting of flexible material that can be maintained centered within the wheel area of an automobile tire in such a manner as to provide an advertising surface that will not warp or otherwise become detractive in appearance.

Ordinarily an advertising disc maintained within the wheel area allows only one side of the automobile tire available for display purposes, because the support for the advertising disc usually projects beyond the tire onto a bearing surface, such as a floor or sidewalk.

Another object of the present invention is to provide an advertising disc, two of which can be inserted in one and the same tire thus permitting both sides of the tire to be displayed simultaneously for advertising purposes.

The invention will first be hereinafter more particularly described with reference to the accompanying drawing, which is to be taken as a part of this specification and then pointed out in the claims at the end of the description.

In the accompanying drawing:

Fig. 1 is a perspective view of a tire with two of the advertising discs inserted within the wheel area, the lower portion of one being cut away to show a portion of the other attached on the reverse side of the tire casing.

Fig. 2 a rear view of the advertising disc showing the corrugated support attached thereto.

Fig. 3 a top view of the display device.

Fig. 4 a cross section of an automobile casing with two of the display devices inserted within the wheel area.

Referring to the drawing, in which the same reference characters are used to denote corresponding parts in different views, the numeral 1 denotes the cardboard advertising disc; secured thereto on one side, reverse from the side 13 containing the art work is the disc support or easel C.

In Fig. 2 disc support C, in the preferred form, comprises a length of double faced corrugated paper material manufactured with two parallel scorings 4 on one side of the support, so as to permit easy bending of the material at the point of scoring. This member is shown as extending substantially along the central portion of disc 1, the length of the member being substantially the measurement of the diameter of disc 1. Parallel portions of the support C, which are divided by the scorings 4, form holding flaps 3. Scorings 4 substantially divide the said support C into three equal parts, the center portion 5 being attached to disc 1 and made integral therewith as shown in Fig. 3. The alternate ridges and grooves 7 of the corrugated material are at right angles to the length of support C.

Holding flaps 3 are movable in relation to disc 1 as indicated in Fig. 3. Due to the peculiar construction of double faced corrugated support C flaps 3 have an inherent springlike quality that tends to maintain the flaps parallel to the plane of the face of the cardboard disc 1.

Disc 1 of flexible paper stock material contains what is commonly known by paper manufacturers as a grain which is represented by shading G as shown in Fig. 2. It is common knowledge that it is easier to bend a piece of paper stock or cardboard with its grain than against its grain. Upon this feature of paper stock is based a portion of the invention.

In Fig. 4 a cross section of tire casing 2 indicates two of the devices disposed within the wheel area of the tire casing. The device being of compact construction, two of the devices are easily adapted for simultaneous insertion in both sides of tire casing 2 for advertising display purposes. This is shown in Fig. 4.

When the device is made up of paper stock, particularly lightweight paper stock, it is essential to provide stability and rigidity to the advertising disc 1 so that it will not warp and will maintain itself centered within the automobile tire casing. This object is accomplished by attaching by paste, glue or other means support C to disc 1, its length being substantially in the central portion of disc 1 at right angular relation to grain G of disc 1 as shown in Fig. 2. Considerable rigidity is secured by disc 1 when it is maintained within the wheel area of an automobile tire casing 2 by opposite end portions of holding flaps 3 as shown in the cut away portion of Fig. 1. It will be seen that the extreme end portions of flaps 3 engage a portion of the inner face 6 of tire bead 11 substantially as shown in Fig. 1.

When the advertising device is to be used within the wheel area of tire casing 2 it will be readily seen flaps 3, of predetermined length, may be disposed in such a manner that they will allow the device to be inserted within a holder such as an automobile tire casing 2 and upon release, because of their substantially inherent springlike nature will adapt themselves to the inner portions of the tire casing 2 at diametrically opposite points of contact, thereby maintaining the advertising device substantially rigid within the holder.

When the advertising display device is used within the wheel area of the tire casing 2 holding flaps 3 exert sufficient pressure against the inner face 6 of bead 11 of tire 2 at diametrically opposite points of contact and causes the disc 1 to be slightly bent against the grain G of the material comprising said disc 1 and presses a portion of said disc 1 near its peripheral edge against the outer casing wall 8 of said tire casing 2, thereby maintaining disc 1 centered within the wheel area of tire casing 2 for display purposes.

Various changes in the details of the construction may be made without departing from the invention which is not to be deemed as limited other than as indicated in the appended claims.

Having thus described my invention, I claim the following:

1. In combination with a tire casing, a display device comprising a sheet member positioned across the casing opening and engaging the outer surface of a bead of the casing and an easel, said easel comprising an elongated piece of resilient sheet material longitudinally divided by parallel scores into a central panel and side flaps, the central panel being attached to the sheet member centrally thereof, the free corners of the flaps bearing against the rear surface of said bead.

2. In combination with a tire casing, a display device comprising a sheet member positioned across the casing opening and engaging the outer surface of a bead of the casing and an easel, said easel comprising an elongated piece of corrugated cardboard material each side having a liner attached thereto, parallel scores on one liner, at right angles to the ridges of corrugation, dividing the easel into a central panel and side flaps, the central panel being attached to the sheet member centrally thereof, the free corners of the flaps bearing against the rear surface of said bead.

3. In combination with a tire casing, a display device comprising a cardboard sheet member positioned across the casing opening and engaging the outer surface of the bead of the casing and an easel, said easel comprising an elongated piece of double faced corrugated cardboard, corrugation ribs of said cardboard at right angles to the longitudinal axis of said easel, said easel longitudinally divided by parallel scores into a central panel and side flaps, the central panel being attached to the sheet member centrally thereof, the free corners of the flaps bearing against the rear surface of said bead.

ROBERT M. RILEY.